Figure 1:
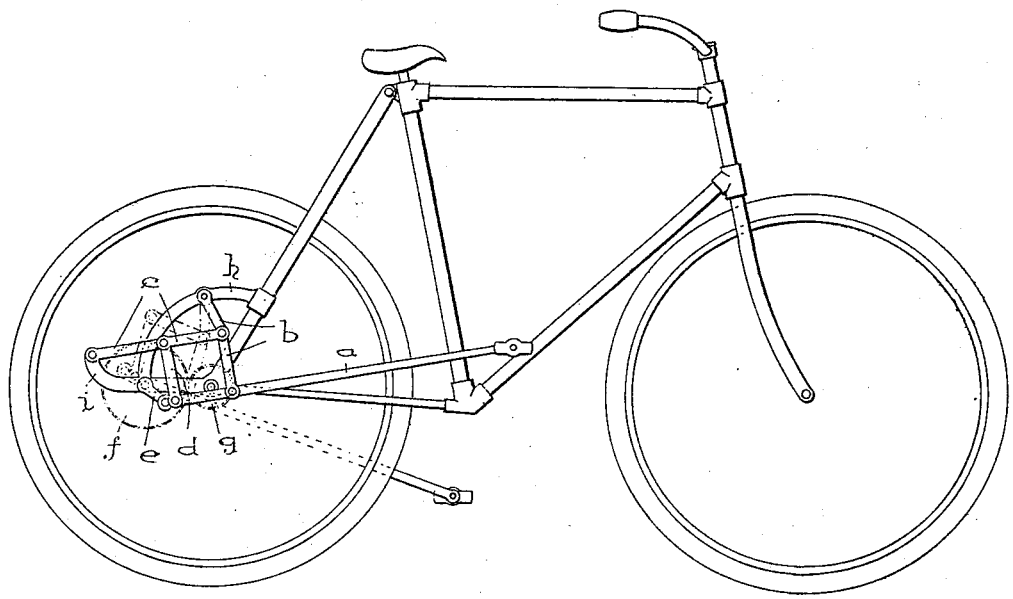

No. 690,411.  
J. W. EDBLAD.  
DRIVING MECHANISM FOR CYCLES.  
(Application filed Nov. 6, 1900.)

Patented Jan. 7, 1902.

(No Model.)

WITNESSES:

INVENTOR

JOHAN WALFRID EDBLAD

BY Howson & Howson,

HIS ATTORNEYS.

UNITED STATES PATENT OFFICE.

JOHAN WALFRID EDBLAD, OF ASELE, SWEDEN.

DRIVING MECHANISM FOR CYCLES.

SPECIFICATION forming part of Letters Patent No. 690,411, dated January 7, 1902.

Application filed November 6, 1900. Serial No. 35,672. (No model.)

*To all whom it may concern:*

Be it known that I, JOHAN WALFRID EDBLAD, a subject of the King of Sweden and Norway, and a resident of Asele, Sweden, have invented an Improvement in Driving Mechanism for Cycles, (on which I have applied for a patent in Sweden, dated September 18, 1899,) of which the following is a specification.

The propulsion of velocipedes has heretofore been largely dependent on the ratio of gearing and the length of the cranks. The present invention has for its purpose to effect a better utilization of the power than hitherto done by the fact that the power is applied not directly to the crank secured to the large driving-gear, but to one end of a two-armed lever attached to the crank-pin of said gear, the fulcrum of which lever is supported in such a manner that it will ascend when the treadle is depressed, so that the levers need not be lowered and raised as much as would otherwise be necessary. One form of the treadle mechanism is shown in the drawings adjoined, wherein—

Figure 2:
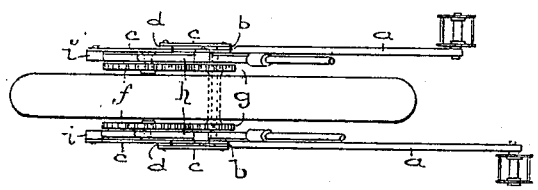

Figure 1 is a side view of a velocipede, and Fig. 2 is a plan of its rear end.

The lever $a$, to the forward end of which the pedal is attached, is fulcrumed on a branch $h$ of the frame by means of a jointed bar $b$, and its rear end is pivoted on the pin of the crank $e$, secured to the driving-gear $f$, which is in engagement with a smaller gear $g$, secured to the rear bicycle-wheel. To the joint of the aforesaid bar $b$ is pivoted a likewise-jointed bar $c$, the other end of which is pivoted to the rear end $i$ of the frame. To the joint of this bar $c$ is pivoted a rigid bar $d$, the other end of which is pivoted to the lever $a$ between the point of attachment of the lever $a$ on the bar $b$ and that of lever $a$ on the crank $e$. A similar mechanism is provided on both sides of the rear wheel.

The mechanism operates as follows: When the forward end of the lever $a$ is depressed, its rear end, which is attached to the crank $e$ of the driving-gear, will ascend and cause the gear to revolve. The bars $b$ and $c$ are simultaneously folded by the rigid bar $d$, which is forced upward and the lever is raised. The result is that the stroke of the treadle is shortened. When one of the levers has been depressed and has caused the driving-gear to revolve half a turn, the pedal of the other lever will be in its top position, to be subsequently depressed in order to rotate the gear the other half of a revolution, and vice versa.

For the jointed bars $b$ $c$ there may be substituted other forms of link connections, and in place of the pair of gears $f$ $g$ other known gearing may be used.

The mechanism above described of changing a reciprocating motion into a rotary one may evidently be used also for other purposes besides propelling velocipedes.

I claim as my invention—

A treadle mechanism for velocipedes, comprising a frame, a gear-wheel and crank, a pedal-lever pivotally secured at one end to the crank of the gear-wheel, two links $b$ pivoted together and one link pivoted to the lever and the other to the frame above the crank, two other links $c$ pivoted together, and one pivoted to the juncture-point of the first two links and the other pivoted to the frame in the rear of the crank, and a link $d$ pivoted at one end to the lever between the crank and the links $b$ and at its other end to the juncture-point of the links $c$.

In testimony whereof I have signed my name to this specification in the presence of two subscribing witnesses.

JOHAN WALFRID EDBLAD.

Witnesses:
G. CARLSON,
A. HELJESTRAND.